US007724125B2

(12) United States Patent
Ghabra et al.

(10) Patent No.: US 7,724,125 B2
(45) Date of Patent: May 25, 2010

(54) REMOTE KEYLESS ENTRY SYSTEM FOR A VEHICLE AND A METHOD OF CONTROLLING A VEHICLE FUNCTION BY THE SAME

(75) Inventors: Riad Ghabra, Dearborn Heights, MI (US); Ronald O. King, Brownstone, MI (US); John S. Nantz, Brighton, MI (US); Tom Q. Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 861 days.

(21) Appl. No.: 11/536,290

(22) Filed: Sep. 28, 2006

(65) Prior Publication Data
US 2008/0088411 A1      Apr. 17, 2008

(51) Int. Cl.
*H04B 1/02* (2006.01)
(52) U.S. Cl. .................. 340/5.64; 340/5.72; 375/225
(58) Field of Classification Search ............ 340/825, 340/5.1–5.2, 5.6–5.67; 307/10.1–10.2; 375/225
See application file for complete search history.

(56) References Cited

U.S. PATENT DOCUMENTS

| | | | |
|---|---|---|---|
| 5,245,346 A * | 9/1993 | Nishimura et al. ............ 342/42 |
| 5,751,197 A * | 5/1998 | Boling, III .............. 331/107 A |
| 6,424,056 B1 | 7/2002 | Irvin | |
| 6,586,988 B2 | 7/2003 | Arisawa | |
| 6,624,758 B1 * | 9/2003 | Omata et al. ........... 340/426.36 |
| 6,714,119 B1 * | 3/2004 | Mindl et al. ............... 340/5.72 |
| 6,738,394 B1 | 5/2004 | Kreuzgruber et al. | |
| 6,885,282 B2 * | 4/2005 | Desai et al. ................ 340/5.61 |
| 6,885,283 B2 * | 4/2005 | O'Connor et al. .......... 340/5.61 |
| 7,095,316 B2 | 8/2006 | Kachouh et al. | |
| 7,102,498 B2 | 9/2006 | Desai et al. | |
| 2003/0122660 A1 * | 7/2003 | Kachouh et al. ............ 340/442 |
| 2004/0036625 A1 | 2/2004 | Omata et al. | |
| 2005/0083175 A1 * | 4/2005 | Yanagimoto ............... 340/5.72 |
| 2005/0134428 A1 | 6/2005 | Desai et al. | |
| 2005/0232376 A1 | 10/2005 | Liem et al. | |
| 2006/0077037 A1 | 4/2006 | Luo et al. | |
| 2006/0093026 A1 * | 5/2006 | Montojo et al. ............. 375/225 |

OTHER PUBLICATIONS

Boucher, Neil J. "The Paging Technology Handbook." John Wiley and Sons: 1995, 2nd edition. pp. 33-48.*

* cited by examiner

*Primary Examiner*—Brian A Zimmerman
*Assistant Examiner*—James Yang
(74) *Attorney, Agent, or Firm*—Brooks Kushman P.C.

(57) ABSTRACT

A remote unit for a keyless entry system for a vehicle. The remote unit comprising a controller configured to generate a command signal in response to a user input. The command signal comprising a first command message and a substantially similar second command message. The first command message comprises a first low data rate portion and the second command message comprises a high data rate portion. The remote unit further comprising a transmitter configured to transmit the command.

14 Claims, 2 Drawing Sheets

REMOTE KEYLESS ENTRY SYSTEM FOR A VEHICLE AND A METHOD OF CONTROLLING A VEHICLE FUNCTION BY THE SAME

FIELD OF THE INVENTION

The present invention relates generally to a remote keyless entry system. More specifically, the invention relates to a keyless entry system for a vehicle including a remote unit and a method of controlling a vehicle function in response to a user input provided to the remote unit.

DETAILED DESCRIPTION OF THE PREFERRED EMBODIMENT(S)

Figure 1:
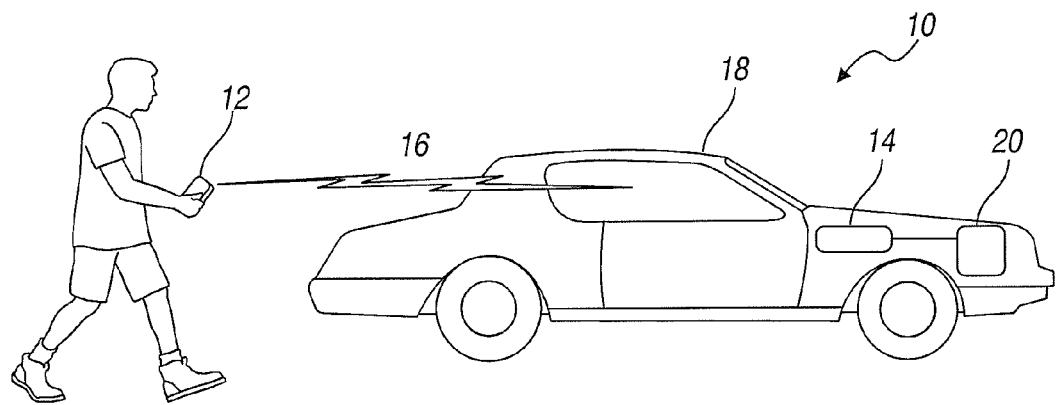
FIG. 1 is a perspective view of an exemplary keyless entry system for a vehicle having a remote unit configured to transmit a command signal in response to a user input and a vehicle-mounted base unit configured to receive the command signal and to control a vehicle function in response to the command signal.

Detailed embodiments of a remote keyless entry (RKE) system are disclosed herein; however, it is understood that the disclosed embodiments are merely exemplary and may be embodied in various and alternative forms. The figures are not necessarily to scale, some figures may be exaggerated or minimized to show details of particular components. Therefore, specific structural and functional details disclosed herein are not to be interpreted as limiting, but merely as a representative basis for the claims and/or as a representative basis for teaching one skilled in the art.

RKE systems for use with motor vehicles are well known in the art. Such systems typically include at least one remote control device, which commonly takes the form of a key fob. The key fob includes a wireless transmitter for use by the vehicle owner or user to transmit wireless, usually radio frequency (RF), vehicle device function signals and may include a number of vehicle function buttons for use in transmitting such signals. A receiver and a controller are typically provided in the vehicle for receiving the device function signals and controlling one or more vehicle devices in order to effect the desired vehicle function.

Vehicle devices which may be remotely controlled in such a fashion include door mechanisms, a vehicle trunk, interior and/or exterior lights, and a vehicle horn or other alarm. More recently, remote vehicle starting, sometimes together with remote temperature control, has been introduced.

A key fob must be small in size in order to facilitate carrying in a user's pocket or purse. Thus miniaturize circuits and a small battery size are employed. Energy efficient microelectronic circuits and methods of operation are necessary in order to minimize battery consumption and maximize battery life. The key fob must also accommodate a transmit/receive antenna that is preferably hidden within the key fob because of esthetic and durability concerns. Therefore, the antenna gain that can normally be achieved is fairly low. The low antenna gain has constrained the operating range over which broadcasts between the portable fob and the vehicle base station can be reliably received.

One method to increase effective range would be to increase the transmitting power. However, government regulations aimed at reducing the likelihood of interference with other transmissions are in place which limit the allowed transmitter power. Prior art transmitters have operated near the regulatory limits and yet operating range has been less than desired for remote operations, such as remote vehicle starting.

Accordingly, there exist a need for a RKE system with increased overall operating range without modification to the remote unit antenna while operating within regulatory power limits. Moreover, it may be preferable that such a remote keyless entry system would also minimize the possibility of a user noticing a latency between controlling a vehicle function and providing an input to the remote unit while within more typical transmission ranges.

Referring to FIGS. 1-4, embodiments of a RKE system will now be described. As previously mentioned, RKE for use with motor vehicles is well known in the automotive industry. The RKE system typically use a hand held transmitter, which may be part of a separate RKE fob, or part of a vehicle ignition keyhead with a keyhead transponder for use in vehicle immobilization. Such transmitters generally utilize an antenna to transmit radio frequency (RF) signals to a vehicle in order to lock and unlock door and truck mechanisms, open or close a vehicle sliding door, activate internal and/or external lights, activate a panic alarm, and remotely start a vehicle, sometimes including remote temperature control. The fob antenna may for example take the form of a monopole antenna formed as a conductive trace on a printed circuit board within the fob. The vehicle typically includes a receiver which utilizes an antenna for receiving the transmitted signal from the fob. The vehicle antenna may for example take the form of a monopole antenna packaged within a wire bundle of the electrical system. A greater antenna length and a higher antenna gain is achievable within a vehicle as compared with an antenna in a fob. This limit on the fob antenna gain correspondingly limits the operating range of the fob at a given transmitting power.

RKE transmitters are also regulated by the FCC as intentional radiators. Each transmitter design is certified so that individual licenses are not necessary for their operation. For example, the FCC regulates RKE devices by imposing a field strength limitation at a respective operating frequency. Compliance with the limits on the field strength may be demonstrated based on the average value of the measured emissions. The FCC also specifies a limit on the peak field strength emission corresponding to a certain decibel level above the maximum permitted average limit. For example, the FCC has had a limit on peak field strength emissions corresponding to 20 dB above the maximum permitted average limit. Therefore, a peak signal strength greater than the specified field strength limit is permissible provided the average emissions and the peak emissions are within their respective limits.

The data contained in a typical message sent by an RKE fob to the vehicle includes a transmitter identifier and an operational code. The transmitter identifier code is used to prevent unauthorized access to the vehicle and the operational code identifies the desired vehicle function as determined by an input provided by the user to the fob. The data of these codes may be encrypted, which is well known in the field and may be done in any suitable manner known by those skilled in the art. A message protocol typically includes a preamble and a data field having a prescribed number of bits. The preamble allows the receiver to detect an incoming message and synchronize its clock. When a user provides an input to a RKE fob, such as for example, by pushing a button or voice activation, the corresponding data message is broadcast. A typical transmission may last about 60 milliseconds.

One embodiment of the RKE system may provide a modified message protocol which may increases the transmission range between a RKE fob and a vehicle without exceeding the FCC regulatory average field strength limitation. Additionally, this modified message protocol may also minimize the possibility of a noticeable latency in controlling a vehicle function in response to a user input while within more typical transmission ranges. Specifically, one embodiment of the RKE system includes a remote unit for a keyless entry system that transmits a command signal in response to a user input. The command signal includes a first and a second command message that are substantially similar. The first command message includes partitioned low data rate portions, which may be high power, and the second command message includes a comparatively high data rate portion, which may be low power. The high data rate portion may be transmitted interposed between the transmission of the partitioned low data rate portions such that full advantage may be made of the difference between the peak limit and the average limit for field strength and that the second command message may be transmitted within or unnoticeably near a typical transmission time period. For instance, transmission of the high data rate portion 100 milliseconds subsequent to the transmission of a first low data rate portion lasting, for example, 20 milliseconds may hardly be noticed by the user and may therefore, not present a latency concern.

Referring now to the drawings, FIG. 1 illustrates at least one embodiment of a keyless entry system 10. The keyless entry system 10 comprises a remote unit 12 and a vehicle-mounted base unit 14. The remote unit 12 may be a handheld RKE fob, or part of a vehicle ignition keyhead or any other suitable configuration known by those skilled in the art. The remote unit 12 transmits in response to a user input, typically by radio frequency, a command signal 16 which includes a command message. The user input may be provided to the remote unit 12 by any suitable means known by those skilled in the art, such as for example, actuation of a button or voice activation.

The command signal 16 may be received at the vehicle-mounted base unit 14 which may be affixed to the vehicle 18 at any suitable location. The vehicle-mounted base unit 14 translates the command message of the command signal 16 into output control signals. The vehicle-mounted base unit 14 interfaces with a vehicle function 20. The vehicle function 20 is responsive to output signals from the vehicle-mounted base unit 14 to perform functions, such as for example, locking or unlocking the vehicle's doors, activating or deactivating the vehicle's security system, turning on/off the vehicle's lights, or starting the vehicle's engine.

Figure 2:
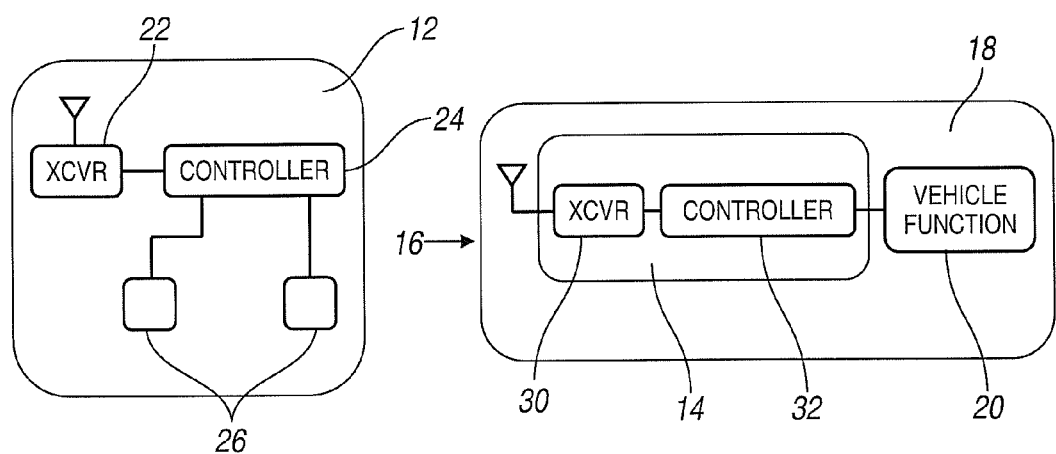
FIG. 2 is an exemplary block diagram of one embodiment of a keyless entry system for a vehicle comprising a remote unit and a vehicle-mounted base unit.

Referring to FIG. 2, one embodiment of a remote keyless entry system is illustrated in a block diagram. In FIG. 2, the transmission between the remote unit 12 and the vehicle-mounted base unit 14 is shown. The remote unit 12 includes a transceiver 22 and a controller 24. The transceiver 22, includes a transmitter and may further include an antenna, may be coupled with the controller 24. The transceiver 22 may in at least one embodiment be a radio frequency transmitter.

The remote unit 12 may include a housing having one or more buttons 26 or switches which allow the user to provide an input. For example, as is illustrated in FIG. 2, a user input may be provided to the remote unit 12 by actuation of a push button 26 which interfaces with the controller 24. The controller 24 may be a computer or other logical device which executes application programs and/or which perform other logical exercises.

The controller 24 is configured in any suitable manner known to those skilled in the art to generate the command signal 16 in response to the user input. The transceiver 22 is configured to transmit the command signal 16 using any known encoding method by those skilled in the art.

The vehicle-mounted base unit 14 includes a transceiver 30 and a controller 32. The transceiver 30, includes a receiver and may further include an antenna, may be coupled with the controller 32. The transceiver 30 may be operative to receive the command signal 16, which may be an encoded radio frequency signal or signals. In at least one embodiment, the transceiver 30 may be a radio frequency receiver.

The controller 32 may be a computer or other logical device which executes application programs and/or which perform other logical exercises. The controller 32 may be operative to process the command signal 16 received from the receiver 30.

The vehicle-mounted base unit 14 may interface with the vehicle function 20 via the controller 32 which is coupled with the vehicle function 20. The vehicle-mounted base unit 14 may be configured to receive the command signal 16 and to control the vehicle function 20 in response to the command signal 16. For example, the vehicle function 20 may include a security system comprising electronic door locks, which may be locked or unlocked in response to the command signal 16 decoded by the controller 32.

Figure 3:
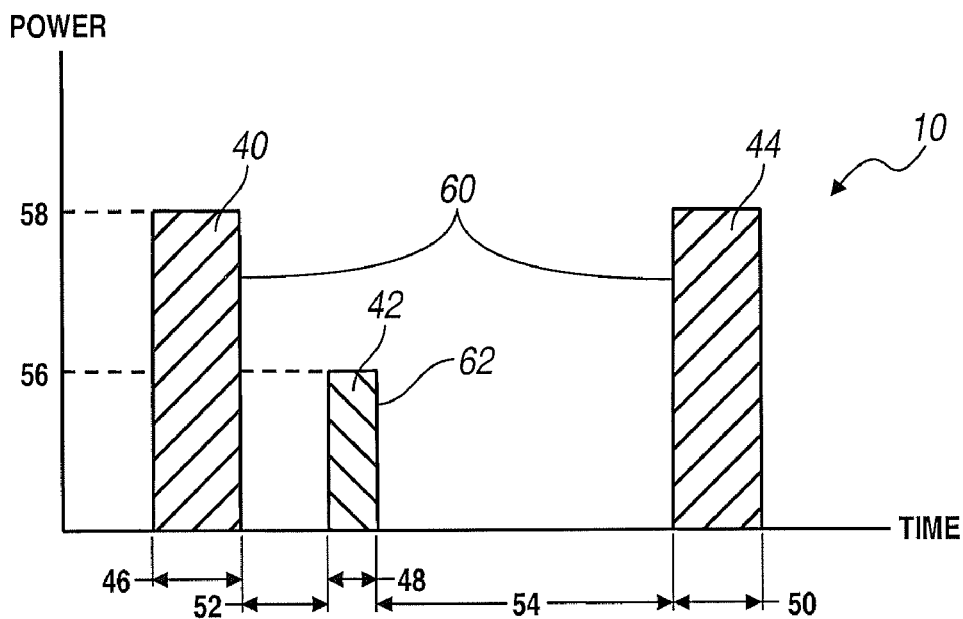
FIG. 3 is an exemplary waveform diagram of one embodiment of a command signal comprising a first command message and a second command message, wherein the first command message includes a first and a second low data rate portion and the second command message includes a high data rate portion.

Referring to FIG. 3, one embodiment of a remote keyless entry system is illustrated in a waveform diagram. As shown in the illustrated embodiment, on-off keying (OOK) amplitude modulation may be utilized. Any other suitable modulation schemes known by those skilled in the art, such as but not limited to, amplitude-shift-keying (ASK), frequency-shift-keying (FSK) or phase-shift-keying (PSK) may also be used. In FIG. 3 the command signal 16 is shown and comprises a first low data rate portion 40, a high data rate portion 42, and a second low data rate portion 44. The first low data rate portion 40 and the second low data rate portion 44 may be, for example, on the order of 1K bits/second, although other alternative transmissions data rates in the range of approximately 500 to 2K bits/second could also be used. The high data rate portion 42 may be, for example, on the order of 10K bits/second, although other transmission data rates in the range of approximately 5K to 20K bits/second could be used.

The first and the second low data rate portion 40 and 44 may also be high power transmissions such as, for example, on the order of 87 dBµV/m, although other alternative high power transmissions in the range of approximately 78 to 95 dBµV/m could be used. The high data portion may also be a low power transmission such as, for example, on the order of 67 dBµV/m, although other alternative low power transmissions in the range of approximately 60 to 74 dBµV/m could be used.

The low data rate portions 40 and 44 and the high data rate portion 42 may have respective lengths 46, 48 and 50 which, for example, may be on the order of 20 milliseconds or otherwise. These portions 40, 42 and 44 may be transmitted serially with periods 52 and 54 between those portions which, for example, may be on the order of 80 milliseconds or otherwise. Additionally, portions 40, 42 and 44 have respective peak field strengths represented on the power axis as 56 and 58. In this embodiment, the first and second high power low data rate portions 40 and 44 are shown to have the same peak field strengths 58. However, other embodiments may have portions 40 and 44 with unequal peak field strengths, but higher than the peak field strength of the high data rate portion 42.

Referring still to FIG. 3, the first low data rate portion 40 precedes the high data rate portion 42. The high data rate portion 42 precedes the second low data rate portion 44. A first command message 60 includes the first low data rate portion 40 and the second low data rate portion 44. In other embodiments, the first command message 60 may include more than two low data rate portions. A second command message includes the high data rate portion 42. In other embodiments, the second command message 62 may include more than one high data rate portion. The first and second command messages 60 and 62 are substantially similar. For example, the first and the second command messages 60 and 62 may both provide a start engine command, even though they may use different modulations schemes. In at least one embodiment, the high data portion 42 may be transmitted without a noticeable latency between providing the user input to the remote unit 12 and performing the vehicle function 20 while within a typical range between the remote unit 12 and the vehicle 18. For example, a typical range may be within 150 m given certain conditions. Moreover, the peak field strengths 56 and 58, transmission lengths 46, 48 and 50, and separation periods 52 and 54 may be matched to take advantage of the FCC limits for peak field strength emission above the maximum permitted average field strength so that the transmission range of the first command message 60 may be greater than the transmission range of the second command message 62. For example, the first command message 60 may be mid range or far range, where the second command message 62 may be near range. Additionally, the first low data rate portion 40 may also further serve to wake up the receiver 30.

Moreover, one embodiment of the RKE system may have the first command message 60 and the second command message 62 received by the vehicle-mounted base unit 14 when the remote unit 12 transmits the command signal 16 within 150 m and the first command message 60 may be received by the vehicle-mounted base unit 14 when the remote unit 12 transmits the command signal 16 within 500 m.

Figure 4:
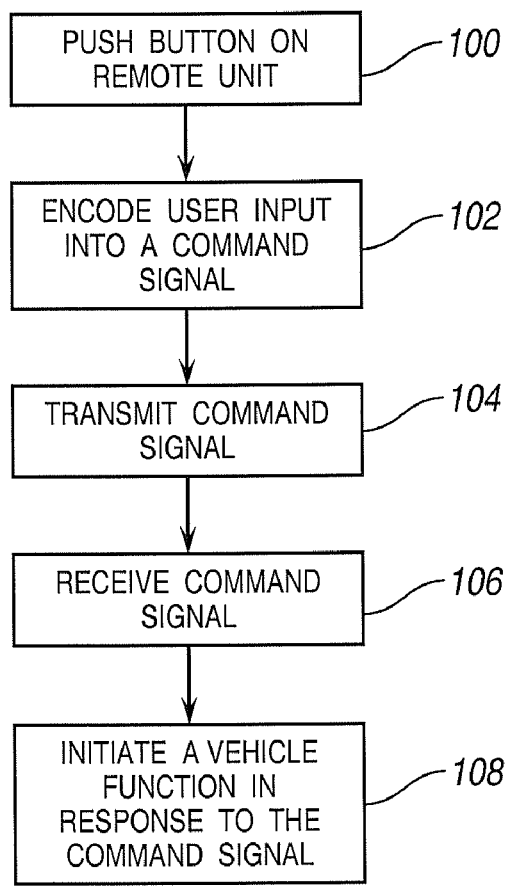
FIG. 4 is an exemplary flow chart illustrating one embodiment of a method of controlling a vehicle function in response to a user input provided to a remote unit.

Referring to FIG. 4, one embodiment of the remote keyless entry system is illustrated in a flow chart. In FIG. 4 a method of controlling a vehicle function in response to a user input provided to the remote unit is shown. A user may provide an input 100 by pushing a button on the remote unit. However, in other embodiments, the user may provide the input by actuating a switch, voice activation, or any other suitable manner known by those skilled in the art. The user input may be encoded 102 into a command signal comprising a first command message including a low data rate portion and a substantially similar second command message including comparatively high data rate portion. Encoding techniques are well understood in the art and any suitable technique known by those skilled in the art may be used. The command signal may be wirelessly transmitted 104 by the remote unit, for example, by RF. The command signal may be received by the vehicle-mounted base unit 106. The vehicle-mounted base unit may then initiates a vehicle function in response to the command signal 108, such as for example, locking or unlock doors, starting the engine or turning on lights.

While embodiments of the invention have been illustrated and described, it is not intended that these embodiments illustrate and describe all possible forms of the invention. Rather, the words used in the specification are words of description rather then limitation, and it is understood that various changes may be made without departing from the spirit and scope of the invention.

What is claimed is:

1. A remote unit for a keyless entry system, the remote unit comprising:
   a controller configured to generate a command signal for transmission during a transmission period in response to a user input, the command signal comprising a first command message and a second command message, wherein the first command message comprises first and second high power, low data rate portions having data indicative of a function corresponding to the user input and the second command message comprises a low power, high data rate portion having data indicative of the function corresponding to the user input;
   wherein the first low data rate portion has a first transmission length within the transmission period, the second low data rate portion has a second transmission length within the transmission period, and the high data rate portion has a third transmission length within the transmission period;
   wherein the data rate portions are arranged in the command signal such that the first low data rate portion precedes the high data rate portion and the high data rate portion precedes the second low data rate portion;
   wherein the power and transmission lengths of the data rate portions are matched such that an average strength of the command signal is lower than a first threshold and such that a peak strength of the command signal is lower than the sum of the average strength of the command signal and a second threshold greater than the first threshold; and
   a transmitter configured to transmit the command signal.

2. The remote unit according to claim 1 wherein the first low data rate portion has a transmission data rate in the range of approximately 500 to 2K bits/second and the high data rate portion has a transmission data rate in the range of approximately 5K and 20K bits/second.

3. The remote unit according to claim 1 wherein the user input corresponds to actuation of a manually-activated control element.

4. The remote unit according to claim 1 wherein the high data rate portion has a power transmission in the range of approximately 60 to 74 dBµV/m and the first low data rate portion has a power transmission in the range of approximately 78 to 95 dBµV/m.

5. A vehicle-mounted base unit for a keyless entry system, the vehicle-mounted base unit comprising:
   a receiver configured to receive a command signal corresponding to a user input, the command signal comprising a first command message and a second command message, wherein the first command message comprises first and second high power, low data rate portions having data indicative of a vehicle function and the second command message comprises a lower power, high data rate portion having data indicative of the vehicle function;
   wherein the first low data rate portion has a first transmission length within a transmission period of the command signal, the second low data rate portion has a second transmission length within the transmission period, and the high data rate portion has a third transmission length within the transmission period;

wherein the data rate portions are arranged in the command signal such that the first low data rate portion entirely precedes the high data rate portion and the high data rate portion entirely precedes the second low data rate portion;

wherein the power and transmission lengths of the data rate portions are matched such that an average strength of the command signal is lower than a first threshold and such that a peak strength of the command signal is lower than the sum of the average strength of the command signal and a second threshold greater than the first threshold; and a controller configured to control the vehicle function in response to the command signal.

6. The vehicle-mounted base unit according to claim 5 wherein the first low data rate portion has a transmission data rate in the range of approximately 500 to 2K bits/second and the high data rate portion has a transmission data rate in the range of approximately 5K and 20K bits/second.

7. The vehicle-mounted base unit according to claim 5 wherein the user input corresponds to actuation of a manually-activated control element.

8. The vehicle-mounted base unit according to claim 5 wherein the high data rate portion has a power transmission in the range of approximately 60 to 74 dBµV/m and the first low data rate portion has a power transmission in the range of approximately 78 to 95 dBµV/m.

9. A keyless entry system for a vehicle, the keyless entry system comprising:

a remote unit configured to transmit a command signal during a transmission period in response to a user input, the command signal comprising a first command message and a second command message, wherein the first command message comprises first and second high power, low data rate portions having data indicative of a vehicle function and the second command message comprises a low power, high data rate portion having data indicative of the vehicle function;

wherein the first low data rate portion has a first transmission length within the transmission period, the second low data rate portion has a second transmission length within the transmission period, and the high data rate portion has a third transmission length within the transmission period;

wherein the data rate portions are arranged in the command signal such that the first low data rate portion precedes the high data rate portion and the high data rate portion precedes the second low data rate portion;

wherein the power and transmission lengths of the data rate portions are matched such that an average strength of the command signal is lower than a first threshold and such that a peak strength of the command signal is lower than the sum of the average strength of the command signal and a second threshold greater than the first threshold; and a vehicle-mounted base unit configured to receive the command signal and to control the vehicle function in response to the command signal.

10. The keyless entry system according to claim 9 wherein the first low data rate portion has a transmission data rate in the range of approximately 500 to 2K bits/second and the high data rate portion has a transmission data rate in the range of approximately 5K and 20K bits/second.

11. The keyless entry system according to claim 9 wherein the user input corresponds to actuation of a manually-activated control element.

12. The keyless entry system according to claim 9 wherein the high data rate portion has a power transmission in the range of approximately 60 to 74 dBµV/m and the first low data rate portion has a power transmission in the range of approximately 78 to 95 dBµV/m.

13. The keyless entry system according to claim 9 wherein the first command message is received by the vehicle-mounted base unit when the remote unit transmits the command signal within 500 m.

14. The keyless entry system according to claim 9 wherein the first low data rate portion initiates the receiver.

* * * * *